(12) United States Patent
Gonzalez

(10) Patent No.: US 8,353,524 B2
(45) Date of Patent: Jan. 15, 2013

(54) WHEELED CART SLIDABLE ONTO HORIZONTAL SURFACE

(76) Inventor: David Gonzalez, Burbank, CA (US)

( * ) Notice: Subject to any disclaimer, the term of this patent is extended or adjusted under 35 U.S.C. 154(b) by 0 days.

(21) Appl. No.: 13/104,617

(22) Filed: May 10, 2011

(65) Prior Publication Data

US 2012/0286484 A1   Nov. 15, 2012

(51) Int. Cl.
*B62B 1/26* (2006.01)
(52) U.S. Cl. ............ 280/654; 280/47.19; 280/47.26; 280/652
(58) Field of Classification Search ........... 280/47.17, 280/47.18, 47.19, 47.2, 47.24, 47.26, 47.28, 280/63, 79.2, DIG. 6, 2; 414/444, 446, 456
See application file for complete search history.

(56) References Cited

U.S. PATENT DOCUMENTS

| | | | | |
|---|---|---|---|---|
| 5,277,439 A | * | 1/1994 | Pipes et al. ............ | 280/47.2 |
| 5,595,395 A | * | 1/1997 | Wilson ............ | 280/47.26 |
| 5,865,449 A | * | 2/1999 | Castaneda ............ | 280/33.996 |
| 6,086,310 A | * | 7/2000 | Lujan et al. ............ | 414/444 |

* cited by examiner

*Primary Examiner* — J. Allen Shriver, II
*Assistant Examiner* — James Triggs
(74) *Attorney, Agent, or Firm* — James A. Italia; Italia IP

(57) ABSTRACT

A wheeled cart capable of rolling along a first environmental surface, which may carry a plurality of storage receptacles in gimballing fashion thereon, and which enables the wheeled cart to be slid onto an elevated second environmental surface. The wheeled cart comprises a base supporting wheels and two upright support posts. A subframe supporting the storage receptacles is pivotally and slidably mounted to the upright support posts. The subframe may be inclined from its usual vertical orientation to a horizontal orientation and slid onto the second environmental surface. The base and support posts may be inclined from their usual vertical orientation to reassume longitudinal alignment with the subframe. Contents of the storage receptacles are thus moved en masse onto the second environmental surface without requiring removal from the wheeled cart, while constantly assuming their orientation relative to a vertical direction because of gimballing action of the storage receptacles.

10 Claims, 7 Drawing Sheets

WHEELED CART SLIDABLE ONTO HORIZONTAL SURFACE

FIELD OF THE INVENTION

The present invention relates to wheeled carts for supporting and transporting storage receptacles, and more particularly to a wheeled cart which is adapted to be tilted towards and slid onto an elevated horizontal environmental surface.

BACKGROUND OF THE INVENTION

Wheeled carts for transporting tools, small parts, work materials, displays, and the like are known. A wheeled cart is practical to move about on a smooth, flat environmental surface. However, should the cart require transport from one locale to another, maneuvering the cart may become difficult. This is particularly true when the cart must be moved from one premises to a transport vehicle to a second premises. The overall weight of the loaded cart may require that a number of people assist in lifting and maneuvering the cart. Also, should the cart be utilized to contain many small objects such as tools, replacement parts, or any other objects which have been placed in organized order within the cart, tipping the cart in the course of moving it may objectionably cause the contained objects to become disorganized. Should the objects contain fluent materials which are not fully enclosed, such as bowls of soup, cans of paint, receptacles of powdered substances, and the like, these fluent materials may be spilled, mixed, and otherwise rendered unuseful when the cart is maneuvered.

SUMMARY OF THE INVENTION

The present invention provides a wheeled cart or rack which is adapted to accommodate being tilted from a generally vertical orientation to a generally horizontal orientation without unduly disturbing contents of the wheeled cart or rack. The cart may comprise a base on which are mounted a plurality of wheels and an upwardly projecting support frame. A subframe is supported on the support frame in a manner enabling both pivoting or teetering of the subframe relative to the base, and also, lateral movement of the subframe relative to the base. At least one storage compartment is pivotally mounted to the subframe, so as to remain upright by gimballing action.

Initially, the frame and subframe are aligned in vertical orientation. When moving the cart from a floor or similar horizontal surface to an elevated horizontal surface, such as a bed of a transport vehicle, a loading dock, a platform of a scaffold, or other surface, the cart is wheeled to close proximity to the elevated surface. The subframe is tilted from its initial vertical orientation relative to the vertically oriented frame until the subframe is horizontally oriented, the frame remaining in the original vertical orientation. The subframe may then be slid horizontally onto the elevated surface. Its weight is borne on integral runners or other support structure as it is slid along the elevated surface. The frame may then be pivoted about the teetering axis until it is once again aligned with the subframe, but with both now horizontally oriented. The frame and subframe may then be locked together to preserve the aligned condition.

The storage compartment or compartments, suspended from the subframe, remain in their original vertical orientation due to the gimballing action throughout the entire transition of the cart from vertical to horizontal. This preserves the order of the small parts, fluent materials, and other objects which may be contained in organized fashion within the storage compartment or compartments. Yet the cart remains easily tilted and loaded from one surface to another, without requiring either that the storage receptacles or their contents be removed to preserve their original order. This greatly expedites moving the cart and its contents simultaneously when the cart is loaded onto the bed of a transport vehicle or other elevated surface.

The cart may have a locking arrangement for locking the frame to the subframe and for locking the storage compartments to the subframe to prevent unintended tilting of one relative to the other, which stabilizes the cart and the storage compartments when not being loaded onto the elevated environmental surface.

A damper may be provided to control otherwise unrestrained swinging of the subframe on the frame.

A height adjustment may be provided to adjust the final height of the subframe on the frame to accommodate loading onto elevated surfaces of different heights above the floor on which the cart initially rolls. Such accommodation may enable the subframe to slide in a purely horizontal direction onto its new supporting surface.

It is an object of the invention to provide a wheeled cart which carries at least one storage receptacle, and which can be easily moved from one elevation to another.

Another object of the invention is to assure that the storage receptacle or receptacles may remain upright throughout the transition in orientation of the cart as it is tilted when being moved from one elevation to another.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
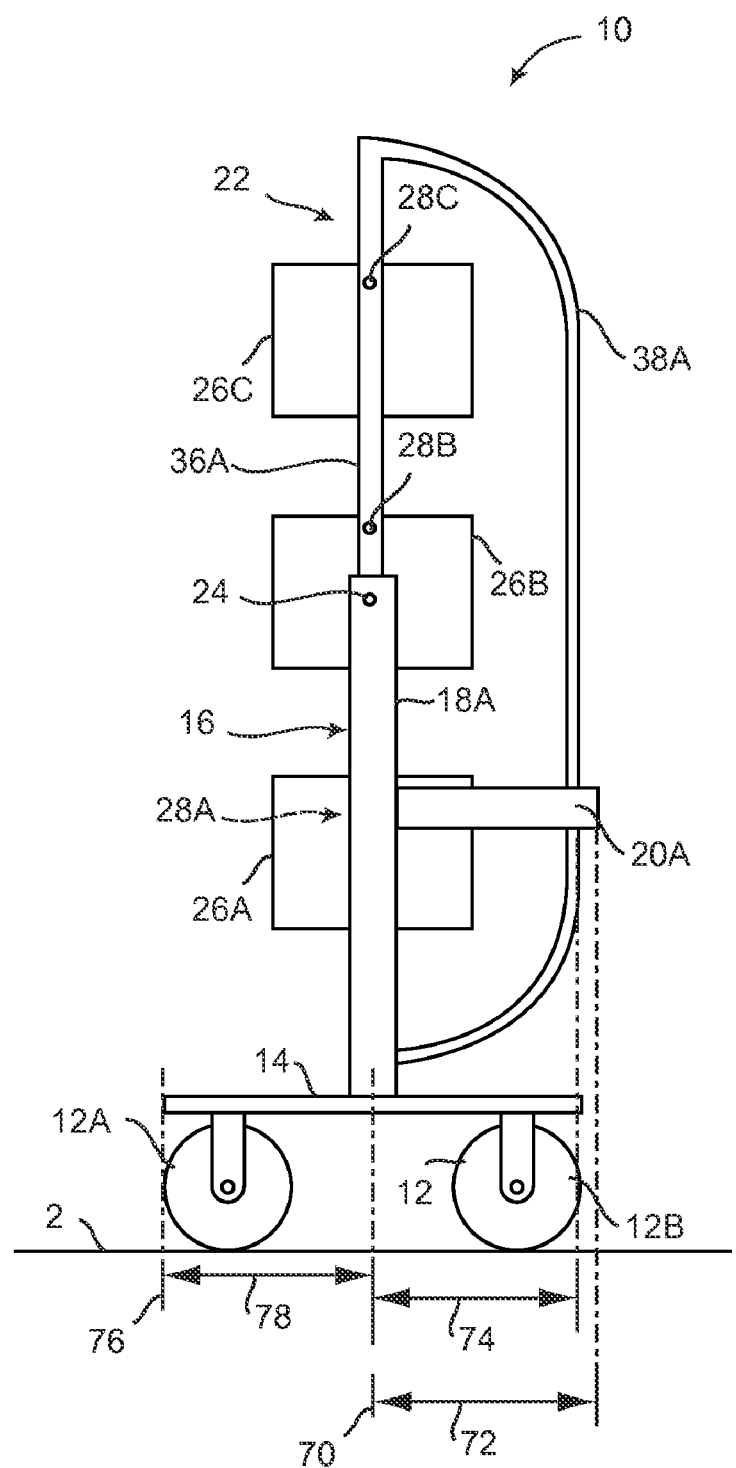
FIG. 1 is an environmental side view of a wheeled cart according to at least one aspect of the invention, showing the wheeled cart in an initial position.

The structure of the present invention is best understood when maneuvering of the subject wheeled cart such as the wheeled cart 10 is understood. The wheeled cart 10 is adapted to be readily moved from one horizontal surface to an elevated horizontal surface. This is shown in successive stages of progress in FIGS. 1-6. A quick review of these Figs. will give the reader an intuitive general understanding of the function of the wheeled cart 10 before structural details of the wheeled cart 10 are presented.

Greater detail of the wheeled cart 10 will be described, referring first to FIG. 1. The wheeled cart 10 according to at least one aspect of the invention is shown in its usual upright position, supported on a first horizontal environmental surface such as a floor 2. The wheeled cart 10 may be rolled on its wheels 12A, 12B (only two wheels 12A, 12B are visible; additional wheels may be present but are concealed from view in the side view of FIG. 1). The wheels 12A, 12B may be caster type wheels to facilitate turning the wheeled cart 10 on the floor 2.

The wheeled cart may comprise a structural base 14 to which the wheels 12A, 12B are mounted to project downwardly from the base, thereby supporting the base 14 above the floor 2. A support frame 16 projects upwardly from the base 14. It should be noted at this point that orientational terms such as upwardly and laterally refer to the subject drawing as viewed by an observer. The drawing figures depict their subject matter in orientations of normal use, which could obviously change should the subject wheeled cart 10 be repositioned. Therefore, orientational terms must be understood to provide semantic basis for purposes of description, and do not limit the invention or its component parts in any particular way.

Figure 7:
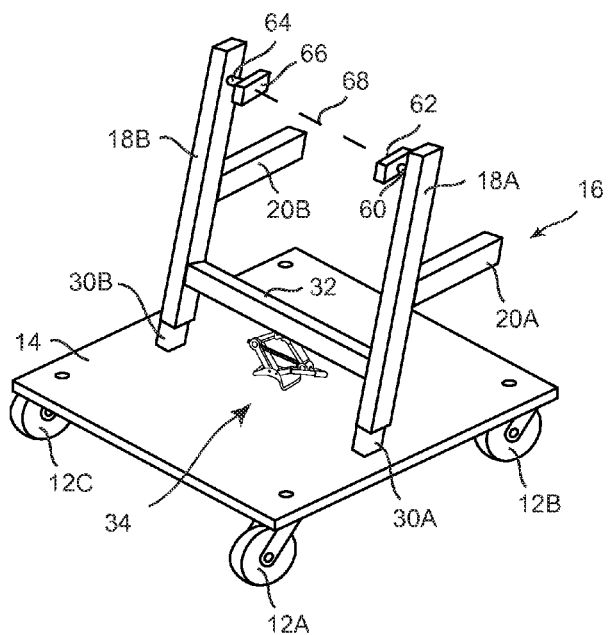
FIG. 7 is a perspective view of a major component of the wheeled cart of FIG. 1.

The support frame 16 may comprise two spaced apart upright support posts fixed to the base 14 (only one upright support post 18A is visible in the side view of FIG. 1; the concealed support post 18B, seen in FIG. 7, may be similar in structure). A bumper post 20A may project laterally from the upright support post 18A. The function of the bumper post 20A will be explained hereinafter. A subframe 22 may be mounted to the support frame 16 so as to be able to both pivot on the support frame 16 about a horizontal axis (seen in end view in FIG. 1 as the end of a pin 24) and to be able to translate horizontally with respect to the support frame 16 independently of pivoting on the support frame 16 about the pin 24. This will be addressed hereinafter with reference to FIG. 2.

At least one storage receptacle is pivotably mounted to the subframe 22. According to one aspect of the invention, preferably at least two storage receptacles and most preferably, three storage receptacles 26A, 26B, 26C are provided and so mounted.

Each one of the storage receptacles 26A, 26B, 26C may be pivotally mounted to the subframe 22 at a point above the center of gravity of the storage receptacle 26A, 26B, or 26C such that each storage receptacle 26A, 26B, or 26C remains in an upright orientation by gimballing action when the subframe 22 is inclined relative to a vertical direction. For example, pins 28A, 28B, 28C (seen only in end view in FIG. 1) may be fixed to the side rail 18 and project towards the storage receptacles 26A, 26B, and 26C. The storage receptacles 26A, 26B, 26C may comprise journals (not visible in FIG. 1) which receive the pins 28A, 28B, 28C to enable pivoting as described. Additional pins may be provided in the unseen support post 18B so that each storage receptacle 26A, 26B, 26C is supported stably at two opposed ends.

Any or all of the storage receptacles 26A, 26B, 26C, not depicted in extreme detail, may comprise at least one drawer (not shown) which can be pulled out from and slid back into the storage receptacle 26A, 26B, or 26C. The storage receptacles 26A, 26B, 26C may take the form of tool chests (not separately shown) for example. Commercially available tool chests having sliding shelves are well known and need not be further detailed herein.

Still referring again to FIG. 1, the upright support post 18A has a longitudinal center line 70 which is vertically oriented in the initial position of the wheeled cart 10. The bumper post 20A is seen to extend from the longitudinal center line 70, projecting in the same direction as that in which the runners 38A, 38B of the subframe 22 project from the side rails 36A, and 36B of the subframe 22. The distance of projection of the bumper post 20A, which is called out by an arrow 72 is greater than the maximal distance of projection by the runner 38A from the longitudinal axis 70, the latter distance being called out by an arrow 74. It will further be seen that the distance signified by the arrow 74 is smaller than the distance from the longitudinal center line 70 to the projection line 76, which projection line 76 demarcates the left edge of the base 14. This distance is called out by an arrow 78. When considered in the side view of FIG. 1, the upright support posts 18A, 18B are collectively located geometrically off-center relative to the base 14 such that when the subframe 22 is in longitudinal alignment with the upright support posts 18A, 18B, as seen in FIG. 1, the combined weights of the upright support posts 18A, 18B, the subframe 22, and the storage receptacles 26A, 26B, 26C are centered relative to the base 14.

The base 14 and support frame 16 are seen in perspective view in FIG. 7. The upright support post 18A is seen to be telescopically receiving a stub post 30A, thus being telescopically adjustable in height above the base 14. The stub post 30A is fixed to the base 14 and slides within the hollow interior of the upright support post 18A. The upright support post 18A and the stub post 30A may be secured in any one of a number of relative positions by an arrangement of aligned holes and pin. This type of arrangement is a well known expedient for securing concentric posts together, and need not be further detailed herein.

The support frame 16 is seen with both upright support posts 18A, 18B, the latter being in the depiction of FIG. 7 a mirror image of the former. Each one of the upright support posts 18A or 18B is joined to the other upright support post 18B or 18A by a sturdy beam 32 which is solidly fixed to both of the upright support posts 18A, 18B.

FIG. 7 also illustrates an optional screw jack 34 which may be disposed to lift the upright support posts 18A, 18B to effect vertical adjustment of height of the upright support posts 18A, 18B above the base 14. The screw jack 34 enables fine adjustment of height while overcoming the combined weight of the support frame 16 and the storage receptacles 26A, 26B, 26C, which weight may be considerable.

Figure 8:
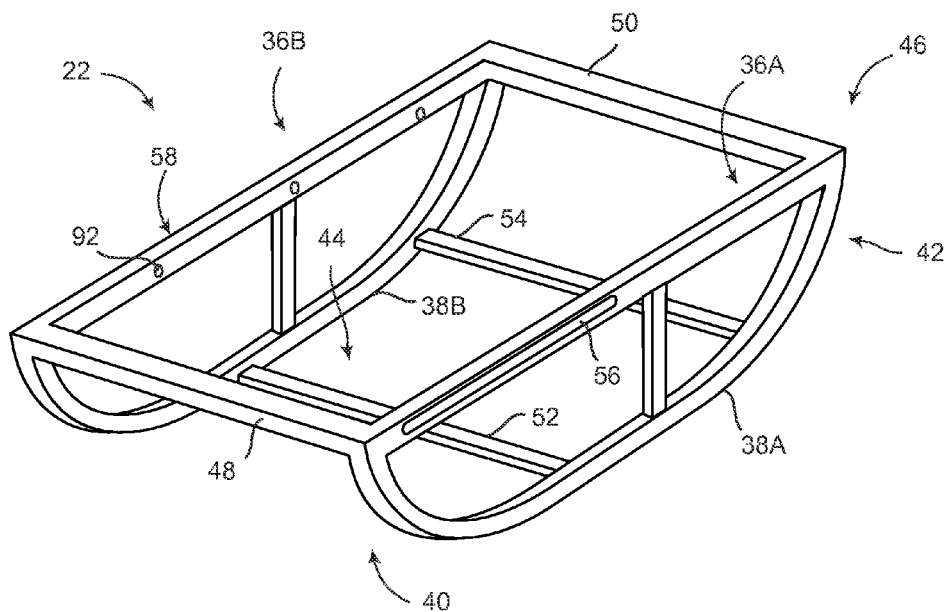
FIG. 8 is a perspective view of another major component of the wheeled cart of FIG. 1.

FIG. 8 advantageously depicts the nature of the subframe 22. The subframe 22 is seen to comprise two parallel spaced apart side rails 36A (visible in FIG. 1), 36B (concealed from view in FIG. 1) and two spaced apart runners 38A (visible in FIG. 1) and 38B (concealed from view in FIG. 1). Each runner 38A or 38B is coupled to one of the side rails 36A or 36B. The runner 38A may comprise a curved first end 40 structurally joined to an end 44 of the side rail 36A and an opposed curved second end 42 structurally joined to an opposed end 46 of the side rail 36A. The runner 38B may be a mirror image of the runner 38A, having the same side rail and runner characteristics but in reverse configuration. The side rails 36A, 36B and the runners 38A, 38B may be joined to one another in parallel, spaced apart relationship by respective end braces 48, 50 and center braces 52, 54.

FIG. 8 also shows longitudinally oriented slots 56 and a mirror image slot 58 hidden in this figure by slide rail 36B formed respectively in the side rails 36A, 36B. Referring again to FIG. 7, the upright support post 18A comprises a projecting finger 60 having an enlarged head in the form for example of a slide block 62 which engages the slot 56 of the side rail 36A. The upright support post 18B, being a mirror image of the upright support post 18A, has an equivalent finger 64 and enlarged head in the form of a slide block 66. The projecting fingers 60, 64 are axially aligned with one another to establish a horizontal axis of pivot 68 extending between the side rails 36A, 36B (when the subframe 22 is assembled to the support frame 16, as seen in FIG. 1) such that the subframe 22 is engaged and supported at two opposed sides and can pivot about the horizontal axis of pivot 68.

Figure 3:
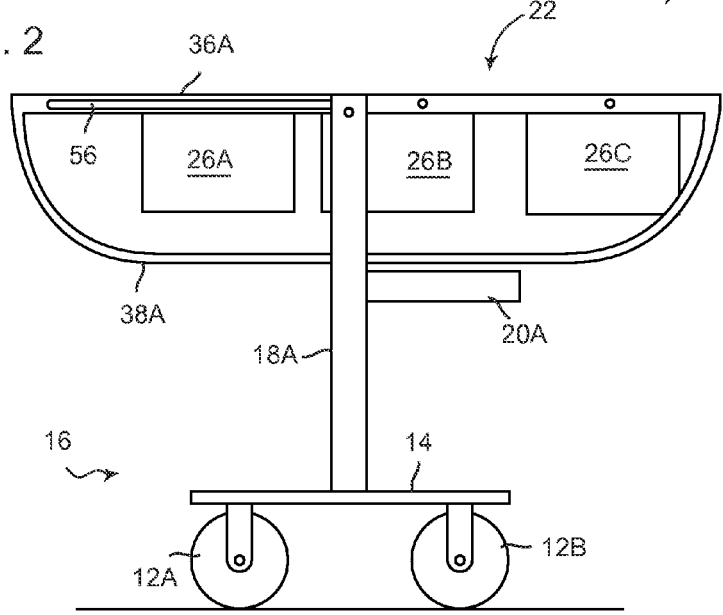
FIG. 3 is similar to FIG. 2, but shows the tilted component fully tilted.
Figure 4:
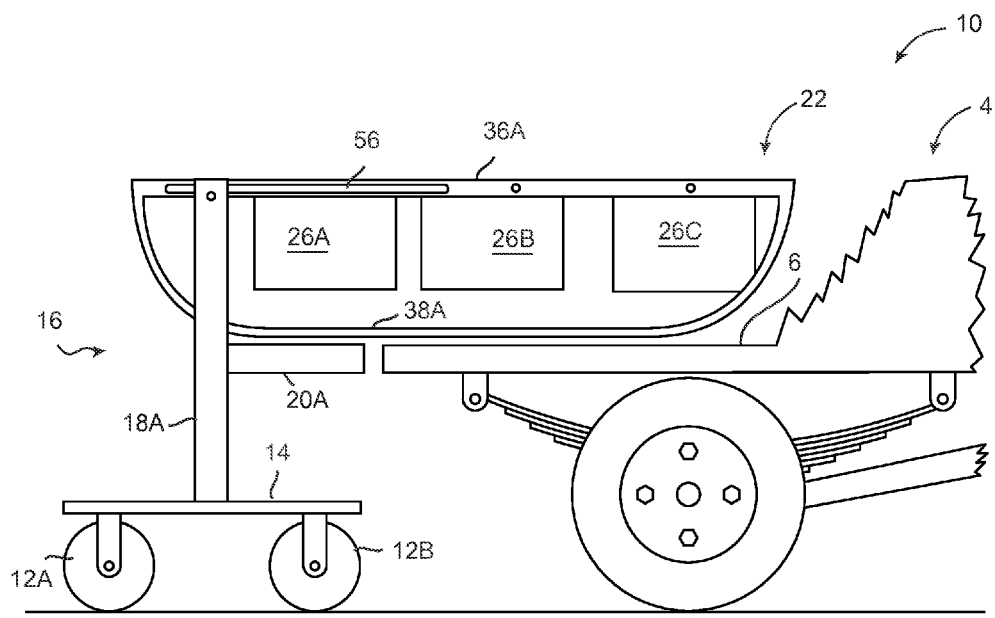
FIG. 4 is an environmental side view of the wheeled cart of FIG. 1 being loaded onto a transport vehicle, with a portion of the transport vehicle broken away to reveal otherwise concealed detail.

The subframe 22 can slide laterally with respect to the projecting fingers 60, 64 independently of pivoting about the horizontal axis of pivot 68. Lateral slide is illustrated in FIGS. 3 and 4. With the subframe 22 and the storage receptacles 26A, 26B, 26C moved to a horizontal orientation, this referring to the longitudinal dimension of the referenced subframe 22 from the vertical orientation seen in FIG. 1, the subframe 22 slides laterally to the right, as seen in FIG. 4. Lateral sliding is accommodated by the length of the slot 56.

Figure 9:
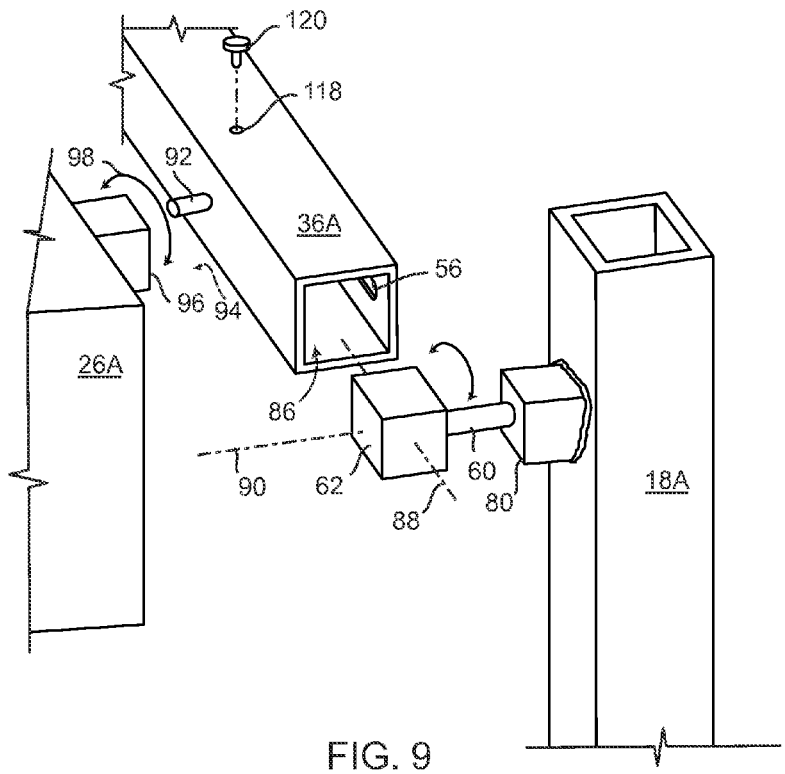
FIG. 9 is an exploded perspective detail view showing connection of some of the components of the wheeled cart of FIG. 1.

This sliding action is illustrated in greater detail in FIG. 9. The upright support post 18A is seen to have a square boss 80 which projects laterally therefrom when the upright support post 18A is vertically oriented. The finger 60 continues the projection of the square boss 80. The finger 60 terminates in the slide block 62 which is dimensioned and configured to fit into the hollow interior 86 of the side rail 36A. The finger 60 passes through the slot 56 formed in the side rail 36A and engages the slide block 62. The side rail 36A can slide laterally, along its longitudinal center line 88 until the finger 60 contacts an end of the slot 56. Thus the length of the slot 56 limits travel of the side rail 36A. The slot 56 extends along most of the length of one side of the side rail 36A, as best seen in FIGS. 3 and 4.

Again referring to FIG. 9, the finger 60 may be immovably fixed to the boss 80 and may turn within the slide block 62, or alternatively, the finger 60 may be fixed to the slide block 62 and turn relative to the boss 80. The finger 60 may turn relative to both the boss 80 and the slide block 62 if desired. Regardless of which of these options is selected, it is seen that the arrangement of the finger 60 and slide block 62 enables both pivoting of the side rail 36A bout the axis 90 of the finger 60, and independently of pivot, enables the side rail 36A to translate along its length relative to the finger 60 and the upright support post 18A. A pin 92 is fixed to the side rail 36A so as to project laterally therefrom in the direction of the storage receptacle 26A. The pin 92 may enter a close fitting hole 94 formed in a boss 96 and thus be rotatably journaled within the boss 96. This enables the storage receptacle 26A to be pivotally suspended from the side rail 36A. Of course, the side rail 36B may be formed in mirror image fashion, so that there is provided an opposed pin (not shown) to assure that the storage receptacle 26A be rotatably journaled at opposed sides. Pivot or rotation of the storage receptacle 26A is indicated by an arrow 98. The remaining storage receptacles 26B, 26C (see FIG. 1) may be similarly supported. Preferably, the pivot should be located above the midpoint position so that the subframe-rack combination can more easily rest in the vertical/upright position.

Figure 10:
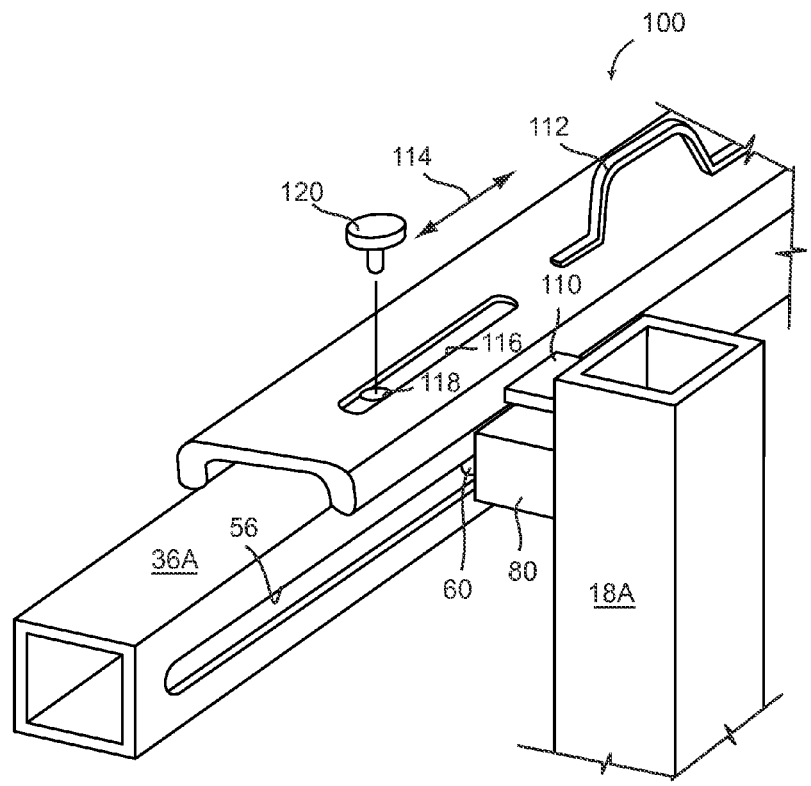
FIG. 10 is a perspective detail view of a locking bar shown in its assembled position in FIG. 11.
Figure 11:
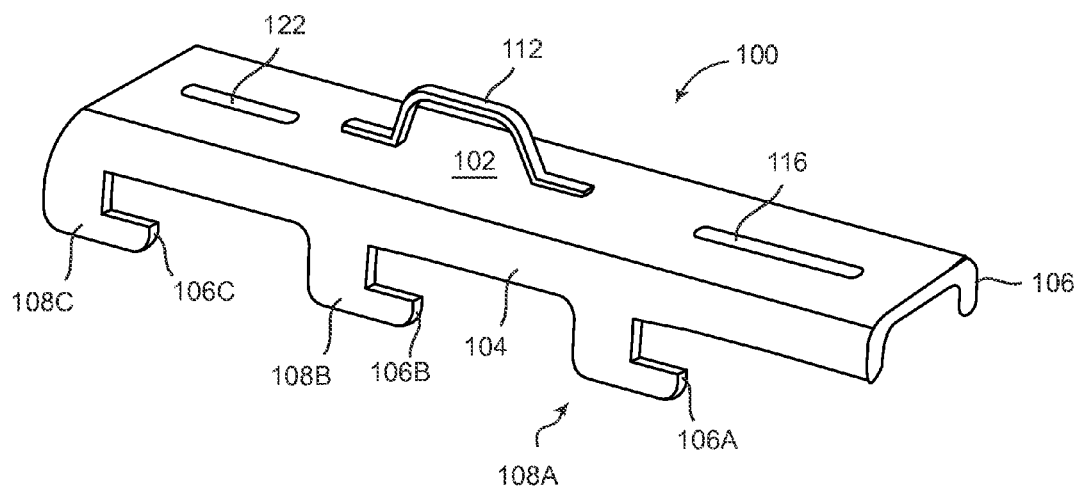
FIG. 11 is an exaggerated enlarged perspective detail view of the components seen at the top center of FIG. 3, but with the addition of the locking bar depicted in its entirety in FIG. 10, drawn to compressed scale in the length dimension.

The wheeled cart 10 may comprise a locking feature which releasably locks the subframe 22 in longitudinal alignment with the upright support posts 18A, 18B. This is shown in FIGS. 10 and 11. FIG. 10 shows the side rail 36A assembled to the upright support post 18A via the boss 80 and the finger 60. A locking bar 100 may fit slidably in close cooperation with and onto the side rail 36A. The locking bar may have a top panel 102 from which depends a first short wall 104 and an opposed second short wall 106. The short wall 104 may have three tabs 106A, 106B, 106C to which are fixed respective sockets 108A, 108B, and 108C. Each socket 108A, 108B, or 108C is dimensioned and configured to fit in close cooperation over the boss of one of the storage receptacles 26A, 26B, or 26C, such as the boss 96 of the storage receptacle 26A (see FIG. 9). The short wall 106 may have one socket 110 (see FIG. 10), which is dimensioned and configured to fit in close cooperation over the boss 80 of the upright support post 18A (see FIG. 10). The locking bar 100 may be grasped by an integral handle 112 and slid along the side rail 36A in directions indicated by an arrow 114.

The locking bar 100, once the sockets 108A, 108B, 108C, and 110 slide over their respective associated bosses 80, 96 (and those bosses, not shown) formed on the remaining storage receptacles 26B and 26C, the subframe 22 is constrained against pivoting about the axis of the pin 24 (see FIG. 1), and the storage receptacles 26A, 26B, 26C are constrained against pivoting relative to the subframe 22. The engaged position of the locking bar 100 would be attained when the locking bar 100 is slid along the side rail 36A until the socket 110 fully engages the boss 80. In the engaged position, a slot 116 overlies a threaded hole 118. A threaded fastener such as a bolt 120 may then be screwed into the threaded hole 118 to releasably secure the locking bar 100 in the engaged position to the side rail 36A of the subframe 22 at any selected location along the length of the side rail 36A within a limited range of travel corresponding to the length of the slot 116. A second slot 122 may be provided for redundantly securing the locking bar 100, for which a second threaded hole (not shown) and a second threaded fastener (not shown) would be provided.

When the bolt 120 is slackened within the hole 118, the locking bar 100 may be slid into a disengaged position wherein the sockets 108A, 108B, 108C and 110 are disengaged from their respective bosses such as the bosses 80 and 96.

The locking bar 100 is functional to slide into the engaged position, which locks the subframe 22 in longitudinal alignment with the upright support posts 18A and 18B, and the disengaged position, wherein the subframe 22 is not locked in longitudinal alignment with the upright support posts 18A and 18B. In the engaged position, the locking bar 100 may interact with the storage receptacles 26A, 26B, 26C to oppose pivot of every one of the storage receptacles 26A, 26B, and 26C relative to the subframe 22.

Figure 12:
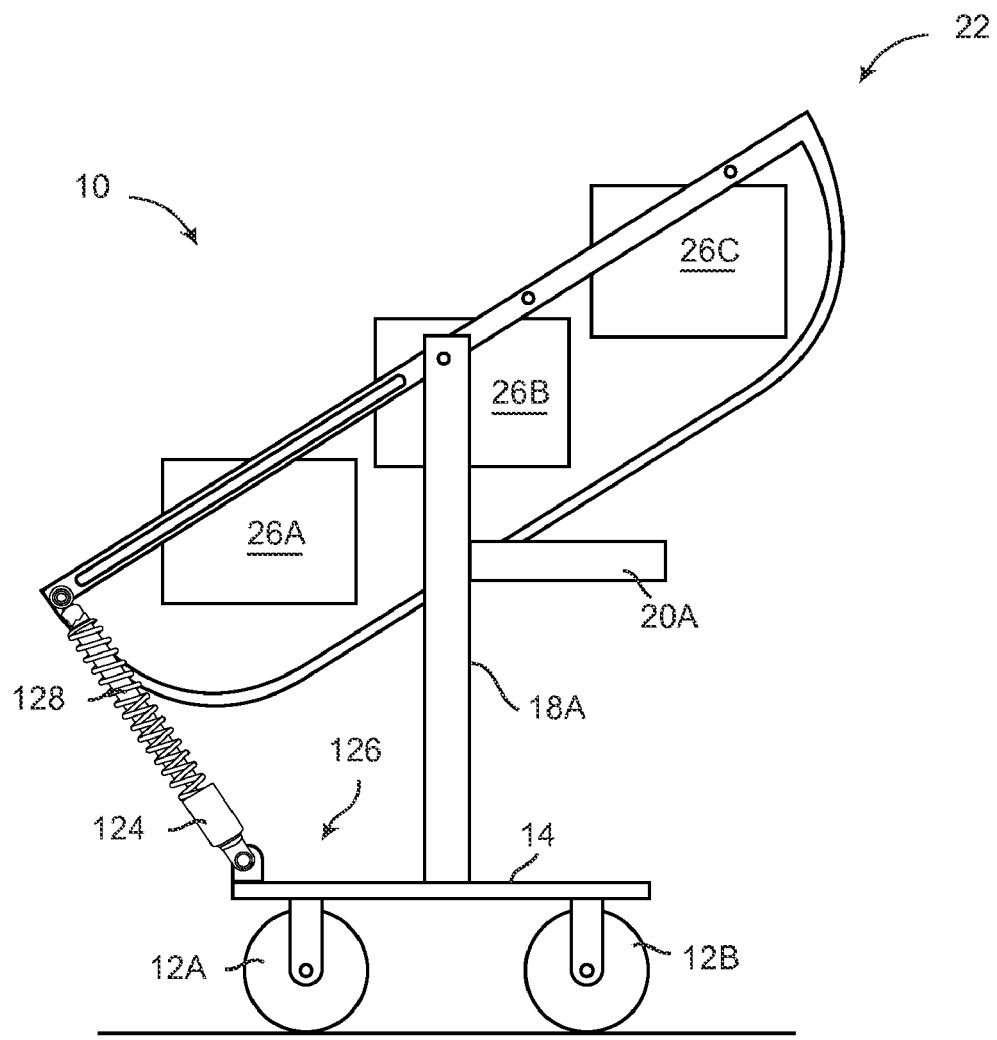
FIG. 12 is a simplified side view of the wheeled cart of FIG. 1, shown with an optional feature added.

FIG. 12 shows the wheeled cart 10 in simplified form, wherein it comprises a damper such as a hydraulic shock absorber 124 which is disposed to limit velocity of pivot of the subframe 22 about the upright support posts 18A, and 18B of the support frame 16. It will be appreciated that in light of the potential weight of the subframe 22 and storage receptacles 26A, 26B, 26C, especially with the latter loaded with metallic objects such as tools, the pivotal mass may become greater than is intuitively anticipated and readily controllable by a person using the wheeled cart 10. The damper feature may assist in maintaining control of the pivotal assembly or mitigating impacts arising therefrom. The shock absorber 124 may be pivotally anchored to the base 14 by a pin and yoke arrangement 126, and by an expansible member such as a spring 128 anchored to the subframe 22.

Figure 2:
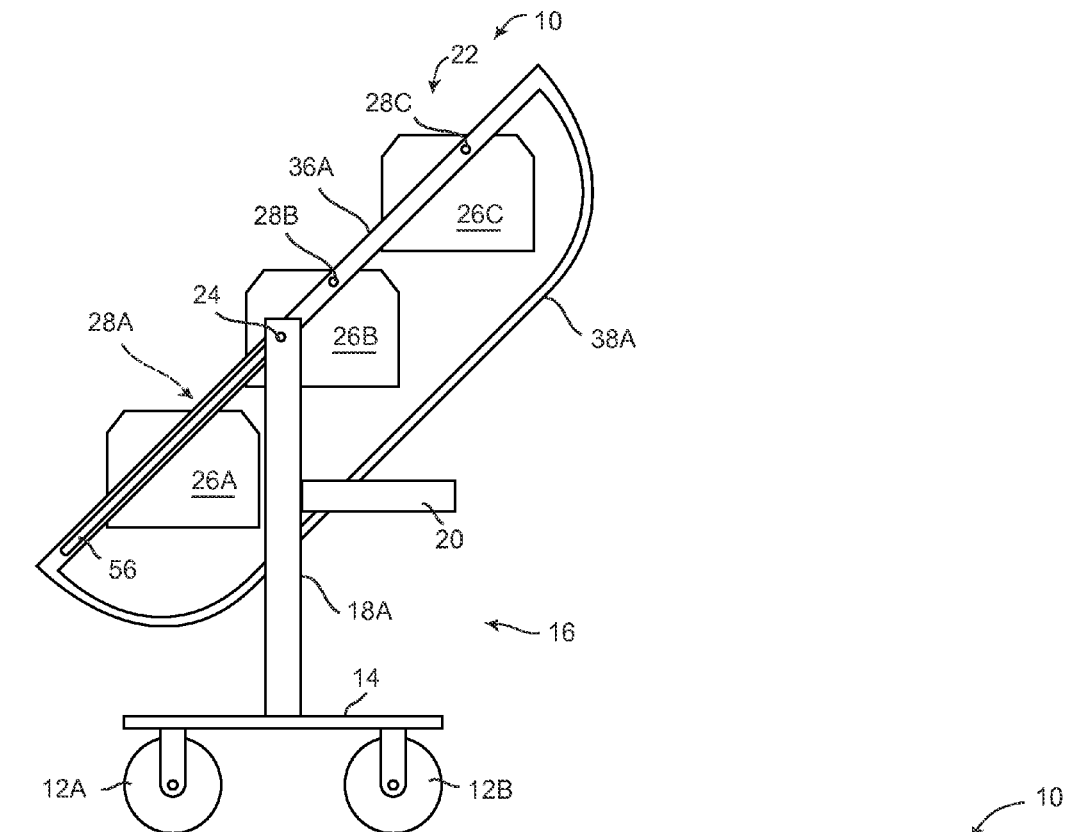
FIG. 2 is a side view of the wheeled cart of FIG. 1, but showing a component inclined from the initial position.

In operation, and referring again to FIGS. 1-6, the wheeled cart 100 may be rolled along a first horizontal surface such as a floor 2. When the wheeled cart is to be transported, it may be wheeled close to a transport vehicle such as a pickup truck 4 (not shown in its entirety; see FIG. 4). The subframe 22 may be inclined from the initial vertical orientation of FIG. 1 until the subframe 22 is horizontally oriented, as seen in FIG. 3. FIG. 2 depicts an intermediate degree of inclination of the subframe 22. Note that throughout inclination, the storage receptacles 26A, 26B, 26C remain in their original orientation.

Referring specifically to FIG. 4, the wheeled cart 10 is brought into abutment with the bed 6 of the pickup truck 4. The bumper posts 20A, 20B make contact first, preventing the runners 38A, 38B from contacting the bed 6. The subframe 22 may then be slid onto the bed 6.

Figure 5:
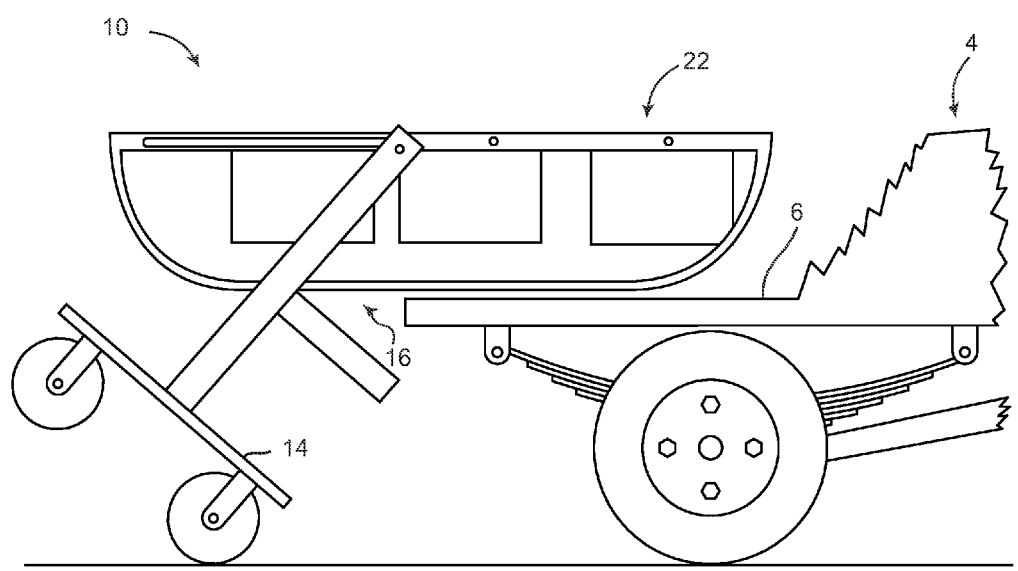
FIG. 5 is an environmental side view similar to FIG. 4, but showing a further stage of progress of loading the wheeled cart onto the transport vehicle.
Figure 6:
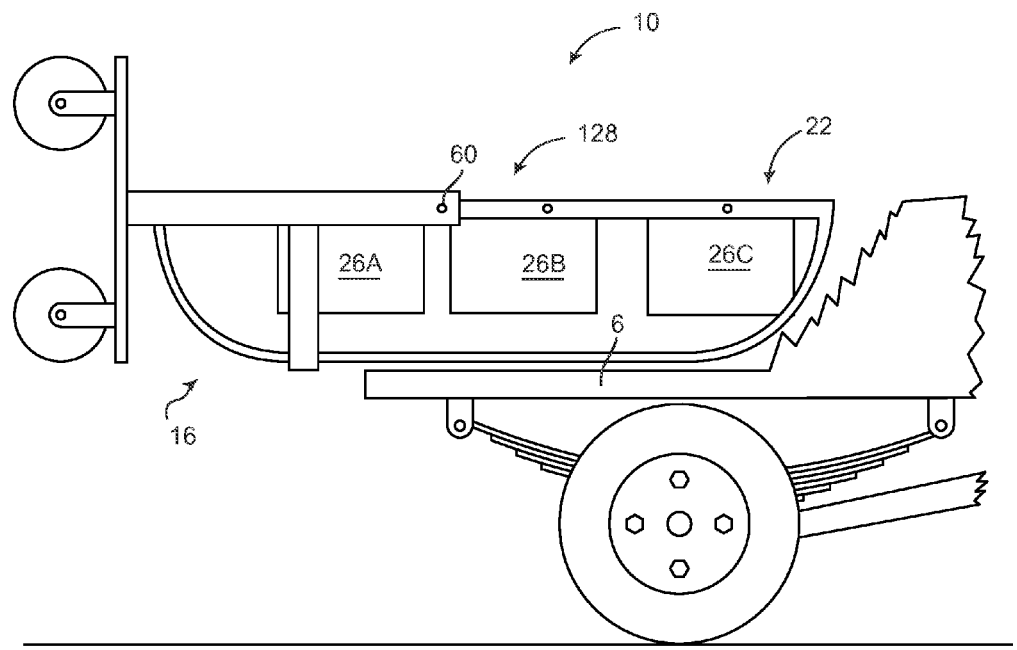
FIG. 6 is an environmental side view similar to FIG. 5, but showing a final stage of progress.

As seen in FIG. 5, the base 14 and support frame 16 are tilted upwardly as a unit from the vertical position seen in FIG. 4. With all weight of the wheeled cart 10 now imposed on the bed 6 of the pickup truck, the wheeled cart 10 may be slid along the bed 6 on the runners 38A, 38B, as seen in FIG. 6. The base 14 and support frame 16 may be slid until the finger 60 abuts the distal end 128 of the slot 56. At this point, the locking bar 100 (see FIG. 10) may be deployed to prevent mutual pivot or rotation between the support frame 16 and the subframe 22. The wheeled cart 10 may of course be slid fully onto the bed 6 of the pickup truck 4 and suitably restrained or lashed down.

Upon reaching a destination, the wheeled cart 10 may be lowered to the ground by reversing the above recited procedure, and wheeled to a new desired location.

Although the invention has been described in terms of certain components being referred to in either the singular or the plural, other arrangements are possible. For example, it is to be understood that due to the conceptual description presented herein, components presented in the plural may be provided in the singular. Illustratively, the wheeled cart 10 may be utilized to carry only one storage receptacle such as the storage receptacle 26A. The arrangement including a support frame 16 having two upright support posts 18A, 18B supporting one subframe 22 may be replaced by a single central support frame on which are mounted two surrounding subframes with associated storage receptacles (this option is not shown).

The present invention is susceptible to modifications and variations which may be introduced thereto without departing from the inventive concepts. For example, the hydraulic shock absorber 124 of FIG. 12 may be replaced by an elastic member, a friction generating arrangement, a variable pitch spring, or still other arrangements.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A wheeled cart which is adapted to be readily moved from one horizontal surface to an elevated horizontal surface, comprising:

a base comprising a plurality of wheels mounted to the base and projecting downwardly therefrom and a support frame comprising two spaced apart upright support posts fixed to the base and projecting upwardly from the base;

a subframe mounted to the support frame so as to be able to both pivot on the support frame about a horizontal axis and to be able to translate horizontally with respect to the support frame independently of pivoting on the support frame; and at least one storage receptacle mounted to the subframe, wherein the subframe comprises two parallel spaced apart side rails and two spaced apart runners each coupled to one of the side rails, wherein each runner comprises a curved first end, wherein the curved first end of each runner is structurally joined to the end of one of the side rails, and, wherein each runner comprises an opposed curved second end which is structurally joined to the other end of that side rail to which its first end is structurally joined.

2. A wheeled cart which is adapted to be readily moved from one horizontal surface to an elevated horizontal surface, comprising:

a base comprising a plurality of wheels mounted to the base and projecting downwardly therefrom and a support frame comprising two spaced apart upright support posts fixed to the base and projecting upwardly from the base;

a subframe mounted to the support frame so as to be able to both pivot on the support frame about a horizontal axis and to be able to translate horizontally with respect to the support frame independently of pivoting on the support frame; and at least one storage receptacle mounted to the subframe, wherein each side rail of the subframe comprises a longitudinally oriented slot, and each upright support post comprises a projecting finger which engages the slot of one of the side rails, and the projecting fingers of the upright support posts are axially aligned with one another to establish a horizontal axis of pivot extending between the side rails such that the subframe is engaged and supported at two opposed sides and can pivot about the horizontal axis of pivot, and wherein the subframe can slide laterally with respect to the projecting fingers of the upright support posts independently of pivoting about the horizontal axis of pivot.

3. A wheeled cart which is adapted to be readily moved from one horizontal surface to an elevated horizontal surface, comprising:

a base comprising a plurality of wheels mounted to the base and projecting downwardly therefrom and a support frame comprising two spaced apart upright support posts fixed to the base and projecting upwardly from the base;

a subframe mounted to the support frame so as to be able to both pivot on the support frame about a horizontal axis and to be able to translate horizontally with respect to the support frame independently of pivoting on the support frame; and at least one storage receptacle mounted to the subframe, wherein each one of the storage receptacles comprises at least one drawer which can be pulled out from and slid back into the storage receptacle.

4. A wheeled cart which is adapted to be readily moved from one horizontal surface to an elevated horizontal surface, comprising:
   a base comprising a plurality of wheels mounted to the base and projecting downwardly therefrom and a support frame comprising two spaced apart upright support posts fixed to the base and projecting upwardly from the base;
   a subframe mounted to the support frame so as to be able to both pivot on the support frame about a horizontal axis and to be able to translate horizontally with respect to the support frame independently of pivoting on the support frame; and
   at least one storage receptacle mounted to the subframe, wherein at least one of the upright support posts comprises an associated bumper post which projects from the center line of its associated upright support post in the same direction as that in which the runners of the subframe project from the side rails of the subframe, and wherein each bumper post projects from its associated upright support post a distance greater than that by which the runners of the subframe project from the side rails of the subframe.

5. A wheeled cart which is adapted to be readily moved from one horizontal surface to an elevated horizontal surface, comprising:
   a base comprising a plurality of wheels mounted to the base and projecting downwardly therefrom and a support frame comprising two spaced apart upright support posts fixed to the base and projecting upwardly from the base;
   a subframe mounted to the support frame so as to be able to both pivot on the support frame about a horizontal axis and to be able to translate horizontally with respect to the support frame independently of pivoting on the support frame; and
   at least one storage receptacle mounted to the subframe, wherein the upright support posts are collectively located geometrically off-center relative to the base such that when the subframe is in longitudinal alignment with the upright support posts, the combined weights of the upright support posts, the subframe, and the storage receptacles are centered relative to the base.

6. A wheeled cart which is adapted to be readily moved from one horizontal surface to an elevated horizontal surface, comprising:
   a base comprising a plurality of wheels mounted to the base and projecting downwardly therefrom and a support frame comprising two spaced apart upright support posts fixed to the base and projecting upwardly from the base;
   a subframe mounted to the support frame so as to be able to both pivot on the support frame about a horizontal axis and to be able to translate horizontally with respect to the support frame independently of pivoting on the support frame; and
   at least one storage receptacle mounted to the subframe, wherein each one of the upright support posts is joined to the other upright support post and is telescopically adjustable in height above the base.

7. The wheeled cart of claim 6, further comprising a screw jack is disposed to lift the upright support posts to effect vertical adjustment of height of the upright support posts above the base.

8. A wheeled cart which is adapted to be readily moved from one horizontal surface to an elevated horizontal surface, comprising:
   a base comprising a plurality of wheels mounted to the base and projecting downwardly therefrom and a support frame comprising two spaced apart upright support posts fixed to the base and projecting upwardly from the base;
   a subframe mounted to the support frame so as to be able to both pivot on the support frame about a horizontal axis and to be able to translate horizontally with respect to the support frame independently of pivoting on the support frame; and
   at least one storage receptacle mounted to the subframe,
   a locking feature which releasably locks the subframe in longitudinal alignment with the upright support posts, wherein the locking feature comprises a bar which is selectively slidable into an engaged position which locks the subframe in longitudinal alignment with the upright support posts and a disengaged position wherein the subframe is not locked in longitudinal alignment with the upright support posts, and wherein in the engaged position, the bar interacts with the storage receptacles to oppose pivot of every one of the storage receptacles relative to the subframe.

9. The wheeled cart of claim 8, further comprising a fastener disposed to releasably secure the bar to the side rail of the subframe at any selected location along the length of the side rail within a limited range of travel.

10. A wheeled cart which is adapted to be readily moved from one horizontal surface to an elevated horizontal surface, comprising:
   a base comprising a plurality of wheels mounted to the base and projecting downwardly therefrom and a support frame comprising two spaced apart upright support posts fixed to the base and projecting upwardly from the base;
   a subframe mounted to the support frame so as to be able to both pivot on the support frame about a horizontal axis and to be able to translate horizontally with respect to the support frame independently of pivoting on the support frame; and
   at least one storage receptacle mounted to the subframe;
   a damper disposed to limit velocity of pivot of the subframe about the support frame.

* * * * *